Aug. 3, 1965     P. F. WARNER     3,198,854
PREPARATION OF BUTADIENE-STYRENE-ALKYL METHACRYLATE POLYMERS
Filed June 26, 1961
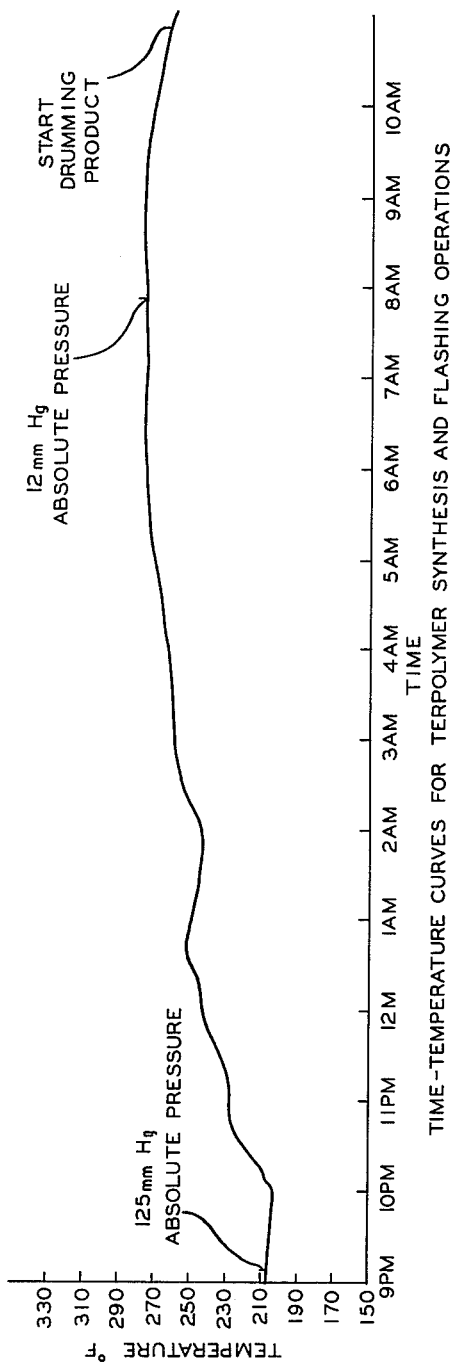
FIG. 1 — TIME-TEMPERATURE CURVES FOR TERPOLYMER SYNTHESIS AND FLASHING OPERATIONS
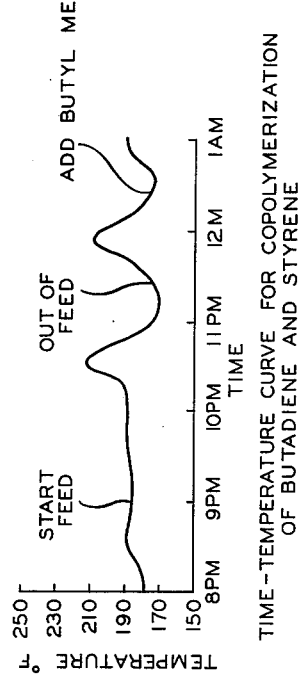
FIG. 2 — TIME-TEMPERATURE CURVE FOR COPOLYMERIZATION OF BUTADIENE AND STYRENE
INVENTOR.
P. F. WARNER
BY
*Hudson & Young*
ATTORNEYS

United States Patent Office 3,198,854
Patented Aug. 3, 1965

3,198,854
PREPARATION OF BUTADIENE-STYRENE-ALKYL METHACRYLATE POLYMERS
Paul F. Warner, Phillips, Tex., assignor to Phillips Petroleum Company, a corporation of Delaware
Filed June 26, 1961, Ser. No. 119,602
8 Claims. (Cl. 260—879)

This invention relates to a novel terpolymer graft copolymer and a method of preparing same. In one of its aspects, this invention relates to a terpolymer of a conjugated diene, a monoolefinic aromatic hydrocarbon and an alkyl methacrylate e.g. butadiene-styrene-butyl methacrylate which is capable of being washed to a satisfactory ash content. In another aspect, this invention relates to the polymerization of monomers while utilizing a substantial reduction in the amount of catalyst ordinarily required for polymerization. In another aspect, this invention relates to the formation of terpolymers while utilizing the same polymerization catalyst throughout the entire polymerization. Still a further aspect of this invention relates to providing a novel terpolymer which is not only capable of being reduced to a satisfactory ash content but which also is of a random type structure.

Due to the tremendous amount of processed foods which are consumed annually and the necessity of providing adequate containers for same, there has arisen the problem of providing a coating for such containers which will prevent contamination of the contents thereof. Because of the magnitude of this problem, many types of materials have been tried with the expectation of providing a desirable coating which is also of such a nature as to compete economically. However, due to various factors such as cost of production, reaction with some types of foods, brittleness, decomposition under some conditions, many of the tested materials have proved to be of limited or no value. Due to their availability and convenient means of preparation, various polymers, plastics and resins have proved to be suitable for providing the desired coatings. However, the use of these materials has been limited due to economic considerations. Therefore, there is an ever continuing need and search for an economical process for producing coating materials which will impart desirable properties.

It is known that various types of polymers can be prepared from different monomeric materials, the particular type and form being generally dependent upon the procedure followed in contacting the materials in the polymerization zone. For example, copolymers, such as butadiene-styrene copolymers, can be prepared by the simultaneous reaction of the copolymerizable monomers. It is also possible to prepare polymers which are commonly known as graft copolymers. Graft copolymers result from the joining of a comonomer to an already formed polymer at random points along the polymer chain. Still another type of polymer can be obtained by following a procedure known as block polymerization. The polymers, usually referred to as block copolymers, are formed by polymerizing a monomer to the end of a polymer, the monomer being introduced in such a manner that substantially all of the co-reacting molecules enter the polymer chain at this point. The particular method used in preparing the polymers has a great influence upon the properties of the product obtained. Thus, copolymers, graft copolymers, and block copolymers differ greatly in their properties even though the weight percent of each of the monomeric materials contained in the polymer may be the same in each case.

It is an object of this invention to provide a novel process for preparing terpolymers of selected conjugated dienes and other unsaturated monomeric materials. Another object of this invention is to provide a catalyst system which utilizes a substantial reduction in the amount of catalyst required for use in the preparation of terpolymers.

Other aspects, objects, and the several advantages of this invention are apparent from a study of this disclosure, the drawing and the appended claims. According to this invention there is provided a process for preparing a terpolymer having random structure which comprises reacting a conjugated diene and a monoolefinic aromatic hydrocarbon to form a coplymer containing reaction mass, adding an alkyl-methacrylate to the resulting co-polymer reaction mass and subsequently recovering the terpolymer therefrom.

Also according to the present invention there is provided a method of preparing terpolymers which comprises, broadly, forming a copolymer of a conjugated diene and a monoolefinic aromatic hydrocarbon e.g. butadiene and styrene using about one percent dispersed alkali metal based on the monomers at a temperature of about 180° F.–190° F. When this reaction is completed, an alkyl methacrylate is added to the alkali metal-copolymer complex, and, after a few minutes reaction time, a quenching solution is added to quench the alkali metal and alkali metal organo compounds. The polymer solution thus formed is then processed through conventional steps to recover the desired polymer.

Also, according to the present invention, there is provided novel terpolymers which have a random structure characteristic. Such polymers can be easily washed and thus allow for obtaining a satisfactory ash content while using regular procedures and equipment.

FIGURE I represents the time-temperature curves for the flashing operation of the filtered product.

The following outlined example is representative of the process of this invention.

*Preparation of terpolymer*

(I) FEEDSTOCKS (a) Solvent—Light rejects (250–350° F.) from Soltrol® 130 manufacture.
(b) Butadiene—rubber grade.
(c) Styrene—rubber grade.
(d) Butylmethacrylate.

Soltrols (a trademark) are odorless solvents fractionated from highly paraffinic feedstocks and composed virtually 100% of isoparaffinic hydrocarbons.

(II) PROCEDURE (a) *Feedstock preparation.*—The 440 gallons of solvent was dried by pumping over bauxite dessicant in a nine cubic foot catalyst bed at a five gallon a minute rate. The bauxite had been activated at a temperature of 350° F. with residue gas.

The 475 pounds of butadiene and 104 pounds of styrene were mixed in an "X" type liquid petroleum gas cylinder. This material was dried and mixed by circulating for two hours over a 0.1 cubic foot bauxite bed. The bauxite had been activated at 450° F. in an air oven.

The butylmethacrylate was used as received.

(b) *Synthesis operations.*—The solvent was charged to 1,000-gallon, glass lined reactor. A vacuum was pulled on the reactor and it was purged with nitrogen to free the system of oxygen. With the reactor agitator on low speed, the speed that was maintained through this operation, the reactor was opened and, with a small nitrogen purge flowing out of the reactor, the catalyst was added. After adding the catalyst (10.5 pounds of metallic sodium finely dispersed in about 4.5 gallons of Soltrol 130), the reactor was closed in and placed on temperature control. Hot water (cooling water—high pressure steam mixture), with the steam on control, was used as the heating media. The solvent was preheated to 187° F. and the butadiene styrene feed started. Operating data for this portion of the synthesis are given in the following Table I.

TABLE I

Synthesis data for preparation of butadiene-styrene copolymer

| Time, p.m. | Temp., °F. | Press., p.s.i.g. | Feed, lbs. | Remarks |
|---|---|---|---|---|
| 8:57 | 187 | 1 | | Start feed. |
| 9:48 | 187 | 18 | 147 | |
| 10:10 | 187 | 25 | 297 | Reaction started. |
| 10:30 | 216 | 8 | 297 | Maximum temp. |
| 10:35 | 213 | 5 | 297 | Start feed. |
| 11:00 | 174 | 10 | 412 | |
| 11:11 | 172 | 13 | 462 | Minimum temp.[1] |
| 11:25 | 175 | 16 | 564 | Out of feed. |

[1] Temperature reached 203° F. on cycle following low temperature.

Following the copolymer synthesis, the reaction mixture was allowed to digest for one hour. A vacuum was then pulled on the reactor and the 115 pounds of butylmethacrylate charged into the reactor at a rate of 10.5 pounds a minute. The feed addition was started at 12:30 a.m. at a temperature of 179° F. The reaction initiated at 12:40 a.m. and reached a maximum temperature of 193° F. at 1:00 a.m. The time-temperature curve for this reaction is shown in FIGURE I.

Following the butylmethacrylate addition, the steam to the reactor jacket was shut off and the reaction mixture was cooled for the rest of the morning before being neutralized. A vacuum was pulled on the reactor and it was then purged with nitrogen. With a small nitrogen purge flowing from the reactor, the reactor was opened and the reaction mixture was neutralized by the addition of 67.5 pounds of a mixture of isopropyl alcohol, sulfuric acid, and water in a 50:40:10 weight ratio. The neutralization mixture had been pre-prepared and was added at a rate of one gallon a minute. The temperature of the mixture did not reach the lower end of the temperature recorder range (150° F.) during the neutralization, the color of the reaction mixture changed from a near black to a light amber color.

(c) *Recovery operations.*—Following neutralization the reaction mixture was allowed to digest one hour and then 200 pounds of Celite 545 filter aid was added to the mixture and mixed for 30 minutes. The mixture was then filtered in a 17 square foot Sparkler filter through Sparkler Grade A cotton rag filter paper. No difficulty was encountered during the filtration, and an average rate of one gallon a minute of filtrate was maintained.

Following the filtration the reactor was flushed twice with about 100 gallons of solvent. The filtered terpolymer was recharged to the reactor and flashed. Full vacuum was pulled on the reactor and heating with low pressure steam was begun. The overhead was condensed in an 18 square fot Karbate condenser and pumped to storage. Approximately 16 hours was required to complete the flashing and final temperature and pressure readings were 277° F. and 12 mm. of Hg absolute pressure. The finished product was pumped from the reactor through a guard filter to drums with a Viking pump. The time-temperature curve for the flashing operation is shown in FIGURE I.

TABLE II

Physical properties of terpolymer of butadiene, styrene and butylmethacrylate

Ash, wt. percent _____ 0.15
Volatile, wt. percent _____ 4.3
Color, Gardner _____ 18
Viscosity: Centistokes @ 210° F. _____ 533

While the above table is limited to the use of butylmethacrylate, it will be obvious to those skilled in the art that other alkyl methacrylates may be used. However, it is believed that butyl is about the optimum and the larger the alkyl group the greater the probable effect on properties of the terpolymer.

While methanol has been disclosed as useful, it will be obvious that any of the lower alcohols may be used in this process.

Likewise, while sodium is preferred in carrying out the polymerization, other alkali metals such as potassium and lithium will be effective.

In carrying out the butadiene-styrene formation step of this invention, the process may be carried out in a temperature range between about 150° F.–250° F., although a more preferred range is about 180° F.–190° F.

This step may be carried out in a time range of about 0.5 to 2.5 hours. However, it is preferred to carry out the reaction in 1 hour.

The ratio of solvent to reactants can be 50:50 to 95:5. However, the preferred ratio is 80:20.

A pressure of 0 to 100 p.s.i.g. can be utilized in forming the copolymers of Step I, although a preferred range of 10 to 30 p.s.i.g. is generally employed.

The ratio of the catalyst to the monomer may be about 0.5:99.5 to 5:95, although a preferred range is that of about 1:99 to 1.5:98.5.

Also, the ratio of butadiene to styrene may be about 20:80 to 90:10, although the preferred ratio is 80:20 to 85:15.

Likewise, in carrying out Step II of the terpolymer formation the ratio of copolymer to alkylmethacrylate may be about 70:30 to 95:5, although the preferred ratio is 85:15.

The pressure may be 0 to about 25 p.s.i.g., although the preferred pressure is about 0 to 10 p.s.i.g.

The temperature for the formation of the terpolymer step may be from about 80° F.–250° F., although the preferred temperature is about 180° F.

The process may be generally carried out in about 0.1 to 1.0 hour, although the preferred time is about 0.25 hour.

The reaction mixture is neutralized by the addition of an isopropyl alcohol, sulfuric acid and water mixture in the ratio by weight of about 50:40:10.

While the terpolymers of this invention have been disclosed as having utility as a coating component for containers, they may also be used as a component for paints and varnishes as well as for other coating purposes.

Soltrol 130 (a trademark) is an odorless solvent fractionated from highly paraffinic feedstocks. The Soltrol 130 is composed virtually of 100 percent of isoparaffinic hydrocarbons. Soltrol 130 distillation range is 335° F.–410° F. Also the Soltrol solvents are usually made by HF alkylation of isoparaffin and olefins.

While methanol may be used to quench the reaction system it is preferred to quench (neutralize) the reactor effluent with a solution of sulfuric acid in isopropanol (80 percent sulfuric diluted with equal volume of isopropanol) using 10 to 20 percent excess over the stoichiometric amount based on the alkali metal.

The neutralized effluent can then be filtered to remove the catalyst (now alkali metal sulfate $H_2O$) and gel. A rotary precoat type filter is recommended for this operation. The term "terpolymer" as used throughout the above specification designates the butadiene-styrene-alkyl methacrylate graft copolymers formed in accordance with the present invention.

Figure II represents a time-temperature curve for copolymerization of butadiene and styrene.

Reasonable variations and modification are possible within the scope of the foregoing disclosure and the appended claims to this invention the essence of which is that there are provided novel terpolymers having improved properties and a novel method of preparing same by the reaction of a butadiene with styrene in the presence of a catalyst and subsequently reacting the copolymer therefrom with an alkylmethacrylate followed by subsequent recovery of the desired terpolymer.

I claim:
1. In a process for preparing a polymer, the steps of:
(a) reacting a conjugated diene and a monoolefinic aromatic hydrocarbon present in a ratio of diene to monoolefinic aromatic hydrocarbon in the range of 20:80 to 90:10 at a temperature in the range of about 150° to 250° F. in the presence of an alkali metal catalyst having a ration of catalyst to monomer in the range of about 0.5:99.5 to 5:95, said alkali metal being the sole catalytic component, and a hydrocarbon solvent present in a solvent to reactants ratio in the range of 50:50 to 95:5, for a time in the range of 0.5 to 2.5 hours;
(b) reacting the resulting mixture of copolymer and catalyst with an alkly methacrylate in a ratio in the range of 70:30 to 95:5, at a pressure in the range 0 to 25 p.s.i.g., at a temperature in the range of 80° to 250° F., for a period of time in the range of 0.1 to 1.0 hour;
(c) neutralizing the resulting terpolymer-catalyst-hydrocarbon mixture; and
(d) recovering the resulting terpolymer therefrom as a product of the process.

2. The process of claim 1 wherein said conjugated diene is butadiene and said monoolefinic aromatic hydrocarbon is styrene.

3. The process of claim 2 wherein the resulting terpolymer-catalyst-hydrocarbon solvent is quenched by the addition of an isopropyl alcohol, sulfuric acid and water mixture in the ration by weight of about 50:40:10.

4. The process of claim 2 wherein the solvent in isoparaffinic hydrocarbon.

5. A butadiene-styrene-butyl methacrylate polymer having a random type structure and low ash content formed by the process of the steps:
(a) reacting butadiene and styrene present in a ratio of butadiene to styrene in the range of 20:80 to 90:10 at a temperature in the range of about 150° to 250° F. in the presence of an alkali metal catalyst having a ration of catalyst to monomer in the range of about 0.5:99.5 to 5:95, said alkali metal being the sole catalytic component, and a hydrocarbon solvent present in a solvent to reactants ration in the range of 50:50 to 95:5, for a time in the range of 0.5 to 2.5 hours;
(b) reacting the resulting mixture of copolymer and catalyst with a butyl methacrylate in a ratio in the range of 70:30 to 95:5, at a pressure in the range of 0 to 25 p.s.i.g., at a temperature in the range of 80° to 250° F., for a period of time in the range of 0.1 to 1.0 hour;
(c) neutralizing the resulting terpolymer-catalyst-hydrocarbon mixture; and
(d) recovering the resulting terpolymer therefrom as a product of the process.

6. In a process for preparing a butadiene-styrene-butyl methacrylate terpolymer, the steps of:
(a) reacting butadiene and styrene present in a ratio of butadiene to styrene in the range of 80:20 to 85:15 at a temperature in the range of 180° to 190° F. in the presence of a sodium catalyst having a ratio of catalyst to monomer in the range of about 1:99 to 1.5:98.5, said sodium metal catalyst being the sole catalytic component, in an isoparaffinic solvent present in a ratio of solvents to reactants of 80:20 for a period of time of about 1 hour;
(b) reacting the resulting mixture of butadiene-styrene copolymer and sodium metal catalyst with butyl methacrylate in a ratio of butadiene-styrene copolymer to butyl methacrylate of 85:15, at a pressure in the range of 0 to 10 p.s.i.g., at a temperature of about 180° F. for a period of time about 0.25 hour;
(c) neutralizing the resulting terpolymer-catalyst-hydrocarbon mixture by the addition of an isopropyl alcohol, sulfuric acid and water mixture in the ratio by weight of about 50:40:10; and
(d) recovering the resulting butadiene-styrene-butyl methacrylate polymer therefrom as a product of the process.

7. A butadiene-styrene-butyl methacrylate polymer having a random type structure and low ash content formed by the process which consists of preparing a copolymer of a butadiene and a styrene in a ratio within the range of 20:80 to 90:10 by weight in the presence of a catalyst consisting of an alkali metal as the sole catalytic component thereof, adding a butyl methacrylate to the alkali metal copolymer complex in an amount within the range of 70:30 to 95:5 by weight, reacting same for a time within the range of 0.1 to 1.0 hour, subsequently quenching the alkali metal and alkali polymer thus formed, and recovering said polymer from the resulting solution.

8. A process for the preparation of a butadiene-styrene-butyl methacrylate polymer which consists of reacting in a solvent butadiene and styrene in amounts within the range of 20:80 to 90:10 by weight in the presence of about 1 percent of an alkali metal as the sole catalyst therefor at a temperature of about 180° to 190° F., adding butyl methacrylate in an amount within the weight ratio of 70:30 to 95:5 by weight to the resulting complex, allowing same to react for a time of about 0.1 to 1.0 hour, subsequently quenching the alkali metal and polymer thus produced, and recovering said polymer from the resulting solution.

References Cited by the Examiner

UNITED STATES PATENTS 2,813,136  11/57  Mertz _____ 260—94.3
2,857,360  10/58  Feuer _____ 260—879

FOREIGN PATENTS 820,089  9/59  Great Britain.

MURRAY TILLMAN, Primary Examiner.

WILLIAM H. SHORT, LEON J. BERCOVITZ,
Examiners.

UNITED STATES PATENT OFFICE
CERTIFICATE OF CORRECTION

Patent No. 3,198,854

August 3, 1965

Paul F. Warner

It is hereby certified that error appears in the above numbered patent requiring correction and that the said Letters Patent should read as corrected below.

Column 5, line 8, for "ration" read -- ratio --; line 15, for "alkly" read -- alkyl --; line 16, after "range", second occurrence, insert -- of --; line 30, for "ration" read -- ratio --; line 31, for "in" read -- is an --; lines 40 and 43, for "ration", each occurrence, read -- ratio --; column 6, line 7, for "solvents" read -- solvent --; line 14, after "time" insert -- of --.

Signed and sealed this 5th day of April 1966.

(SEAL)
Attest:

ERNEST W. SWIDER
Attesting Officer

EDWARD J. BRENNER
Commissioner of Patents